US010042625B2

(12) United States Patent
El Maghraoui et al.

(10) Patent No.: US 10,042,625 B2
(45) Date of Patent: *Aug. 7, 2018

(54) SOFTWARE PATCH MANAGEMENT INCORPORATING SENTIMENT ANALYSIS

(71) Applicant: INTERNATIONAL BUSINESS MACHINES CORPORATION, Armonk, NY (US)

(72) Inventors: Kaoutar El Maghraoui, Yorktown Heights, NY (US); Joefon Jann, Ossining, NY (US); Pratap C. Pattnaik, Ossining, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/639,024

(22) Filed: Mar. 4, 2015

(65) Prior Publication Data
US 2016/0259635 A1 Sep. 8, 2016

(51) Int. Cl.
*G06F 9/44* (2018.01)
*G06F 8/65* (2018.01)
(Continued)

(52) U.S. Cl.
CPC ............ *G06F 8/65* (2013.01); *G06F 17/2785* (2013.01); *G06F 8/71* (2013.01); *G06F 15/18* (2013.01);
(Continued)

(58) Field of Classification Search
CPC ............ G06F 8/60–8/71; G06F 17/274; G06F 17/2785; G06F 15/18; G06N 99/005
See application file for complete search history.

(56) References Cited

U.S. PATENT DOCUMENTS 5,901,225 A  5/1999 Ireton et al.
6,477,703 B1 11/2002 Smith et al.
(Continued)

FOREIGN PATENT DOCUMENTS

EP  2336887  6/2011

OTHER PUBLICATIONS

Office Action issued in U.S. Appl. No. 14/744,315, dated Dec. 19, 2016, pp. 1-10.
(Continued)

*Primary Examiner* — Lewis A Bullock, Jr.
*Assistant Examiner* — Tina Huynh
(74) *Attorney, Agent, or Firm* — Tutunjian & Bitetto, P.C.; Rahan Uddin

(57) ABSTRACT

A method and system are provided. The method includes generating, by a machine-based sentiment prediction generator, respective machine-determined sentiment predictions for each of a plurality of software patches using sentiment analysis. The method further includes setting, by a sentiment-based confidence value generator, a confidence value for each of the plurality of software patches based on the machine-determined sentiment predictions. The method also includes at least one of selecting and prioritizing, by a software patch selector and prioritizer, at least one of the plurality of software patches based on the respective confidence value therefor.

19 Claims, 11 Drawing Sheets

(51) Int. Cl.
*G06F 17/27* (2006.01)
*G06F 15/18* (2006.01)
*G06F 8/71* (2018.01)
*G06N 99/00* (2010.01)

(52) U.S. Cl.
CPC .......... *G06F 17/274* (2013.01); *G06N 99/005* (2013.01)

(56) References Cited

U.S. PATENT DOCUMENTS

| | | | |
|---|---|---|---|
| 7,020,875 B2 | 3/2006 | Zweifel et al. | |
| 7,689,624 B2 | 3/2010 | Huang et al. | |
| 7,996,210 B2 | 8/2011 | Godbole et al. | |
| 8,244,651 B1* | 8/2012 | Lin ................... | G06N 99/005 706/12 |
| 8,615,752 B2 | 12/2013 | Izard et al. | |
| 8,768,867 B1* | 7/2014 | Thaeler ............... | G06Q 30/02 706/12 |
| 9,020,956 B1* | 4/2015 | Barr ................... | G06F 17/30864 707/748 |
| 2009/0281870 A1* | 11/2009 | Sun .................... | G06Q 10/10 705/7.29 |
| 2010/0169874 A1* | 7/2010 | Izard .................. | G06F 8/71 717/170 |
| 2012/0166183 A1 | 6/2012 | Suendermann et al. | |
| 2012/0191631 A1 | 7/2012 | Breckenridge | |
| 2013/0282430 A1* | 10/2013 | Kannan ............... | G06Q 30/02 705/7.29 |
| 2014/0019457 A1* | 1/2014 | Xie .................... | G06F 17/30321 707/741 |
| 2014/0052684 A1* | 2/2014 | Liao ................... | G06F 17/2785 706/46 |
| 2014/0188793 A1* | 7/2014 | Dujmovic ........... | G06F 17/30174 707/611 |
| 2014/0337257 A1* | 11/2014 | Chatterjee .......... | G06N 99/005 706/12 |
| 2015/0199191 A1* | 7/2015 | Bhasin ............... | G06F 11/302 717/168 |
| 2015/0369705 A1* | 12/2015 | Kruglick ............ | G06Q 10/10 702/188 |
| 2016/0119365 A1* | 4/2016 | Barel .................. | H04L 63/1408 726/12 |

OTHER PUBLICATIONS

Office Action issued in U.S. Appl. No. 14/744,315, dated Nov. 15, 2017, pp. 1-18.

* cited by examiner

SOFTWARE PATCH MANAGEMENT INCORPORATING SENTIMENT ANALYSIS

BACKGROUND

Technical Field

The present invention relates generally to computing systems and, in particular, to software patch management incorporating sentiment analysis.

Description of the Related Art

Software patches are often provided to reduce security problems, to improve the user experience of software, systems and/or devices, and/or to fix existing bugs and vulnerabilities in such software, systems and/or devices. Large sets of software patches are sometimes referred to as "service packs".

The installation of software patches can often cause a user to become agitated and/or otherwise express some sentiment regarding having to install the software patch. Users can also express satisfaction or anger sentiment prior to installing patch in case the recommended software patch installation did not result in the desired effect (fixing a bug for example). Accordingly, there is a need to analyze sentiment relating to the installation of software patches.

SUMMARY

According to an aspect of the present principles, a method is provided. The method includes generating, by a machine-based sentiment prediction generator, respective machine-determined sentiment predictions for each of a plurality of software patches using sentiment analysis. The method further includes setting, by a sentiment-based confidence value generator, a confidence value for each of the plurality of software patches based on the machine-determined sentiment predictions. The method also includes at least one of selecting and prioritizing, by a software patch selector and prioritizer, at least one of the plurality of software patches based on the respective confidence value therefor.

According to another aspect of the present principles, a system is provided. The system includes a machine-based sentiment prediction generator for generating respective machine-determined sentiment predictions for each of a plurality of software patches using sentiment analysis. The system further includes a sentiment-based confidence value generator for setting a confidence value for each of the plurality of software patches based on the machine-determined sentiment predictions. The system also includes a software patch selector and prioritizer for at least one of selecting and prioritizing at least one of the plurality of software patches based on the respective confidence value therefor.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to software patch management incorporating sentiment analysis. Advantageously, the present principles can be applied to any type of software patch. For example, the present principles can be applied to software patches where a computer program, a middleware application, an operating system, and so forth (as well as data associated with these programs and systems) are updated to improve such programs and systems. Of course, the preceding are merely illustrative examples of items to which patches can be applied, and the present principles can be readily applied to other items as readily appreciated by one of ordinary skill in the art given the teachings of the present principles provided herein, while maintaining the spirit of the present principles.

Advantageously, the present principles can be implemented as a method, a system, and/or a service. In an embodiment, based on sentiment analysis relating to a software patch, a confidence level associated with one or more software patches is set or adjusted. In an embodiment, each software patch in a set of potentially applicable software patches is associated with a respective confidence level. In an embodiment, the confidence level is used to select one or more patches from the set of patches and/or to prioritize one or more patches in the set of patches.

Figure 1:
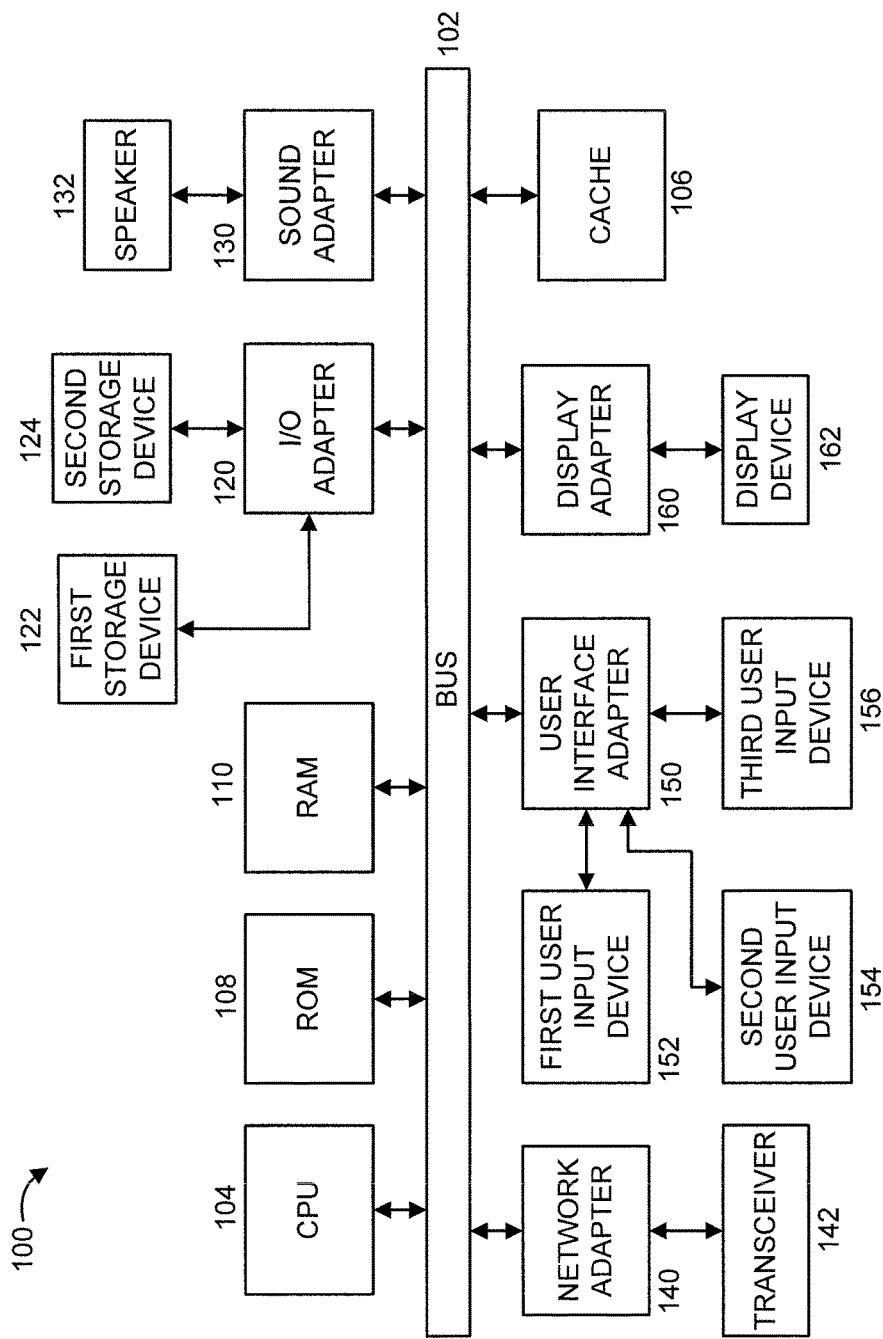
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
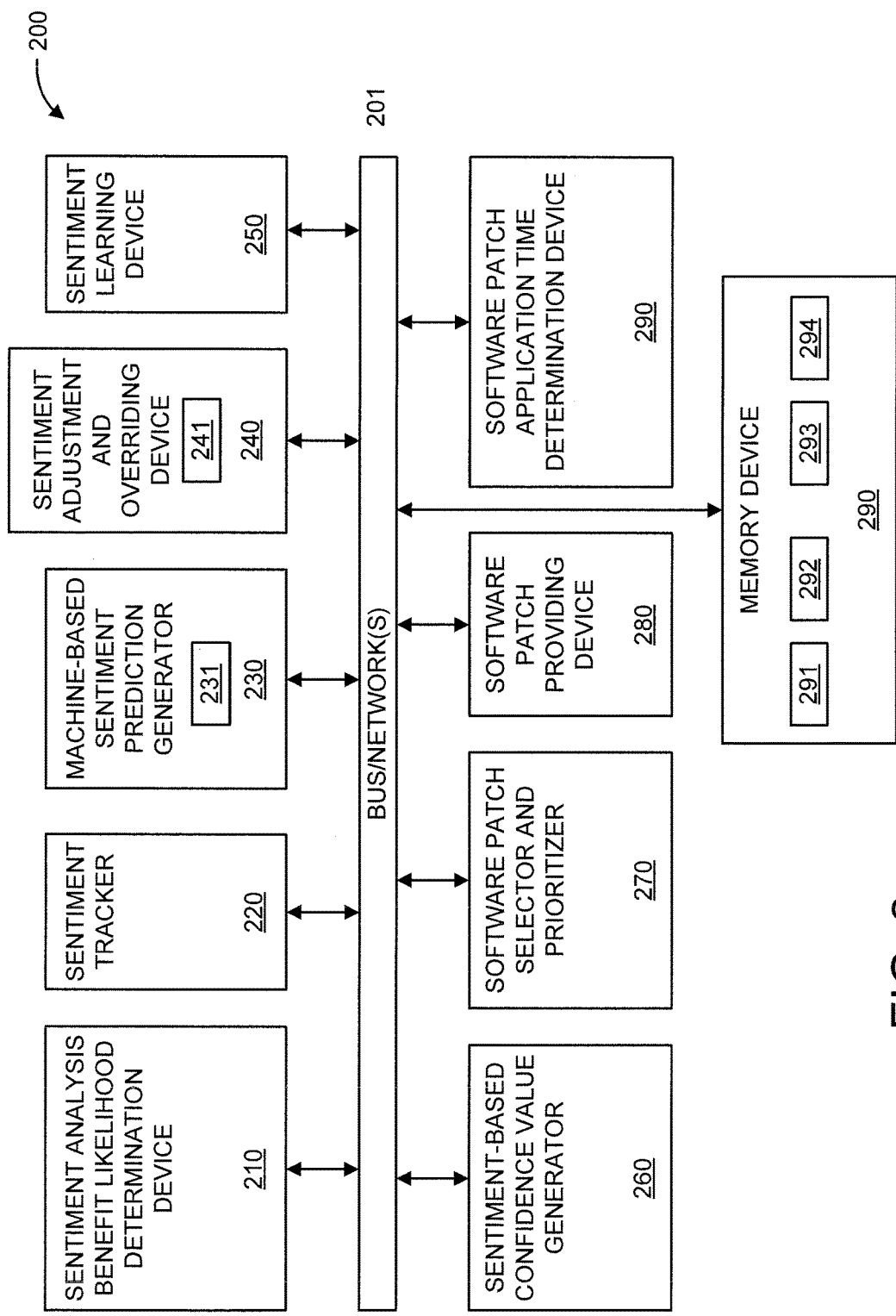
FIG. 2 shows an exemplary system 200 for learning intended user actions utilizing speech and gesture recognition, in accordance with an embodiment of the present principles.
Figure 3:
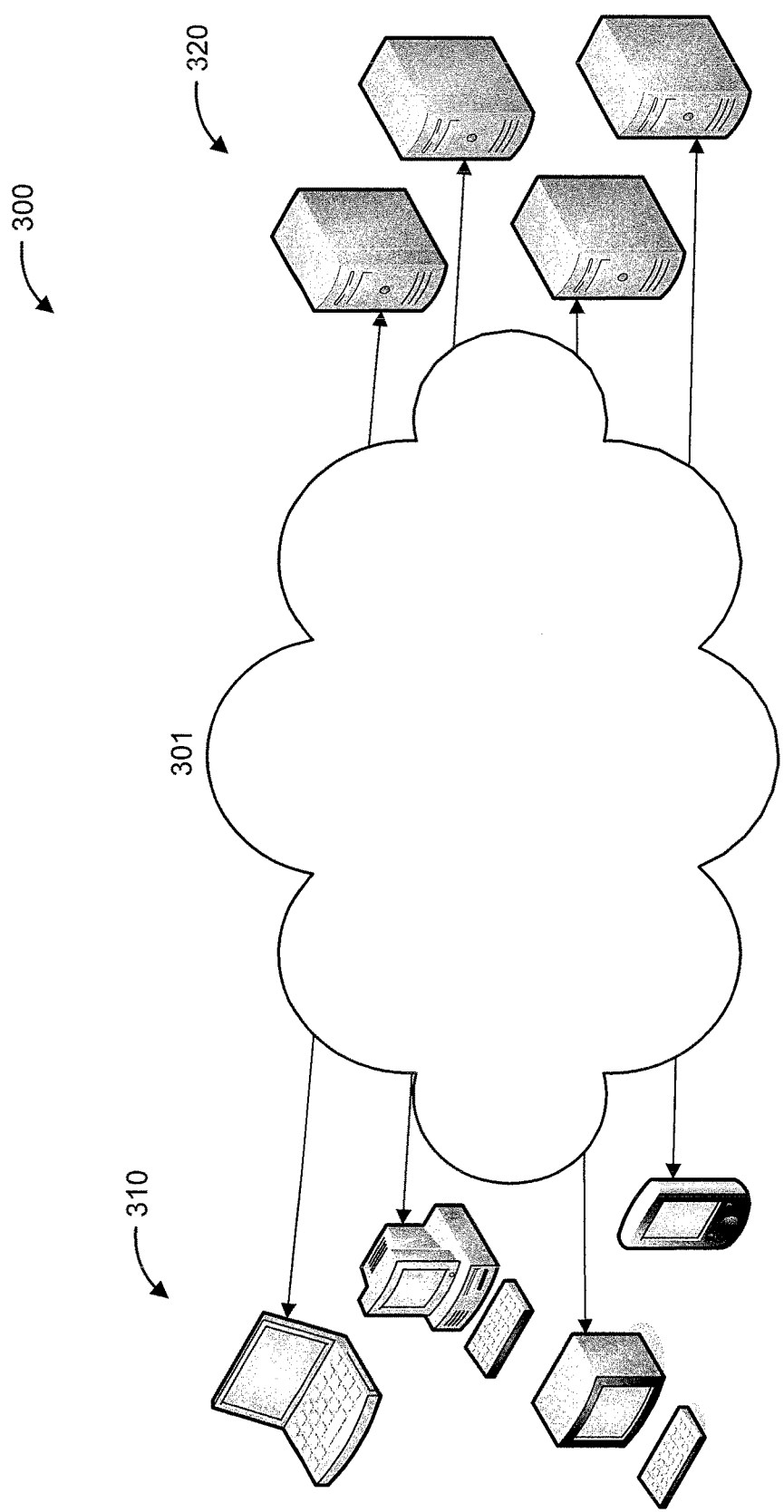
FIG. 3 shows an exemplary computing environment 300 to which the present principles can be applied, in accordance with an embodiment of the present principles.

Moreover, it is to be appreciated that system 200 described below with respect to FIG. 2 is a system for implementing respective embodiments of the present principles. Further, it is to be appreciated that computing environment 300 described below with respect to FIG. 3 is a computing environment for implementing respective embodiments of the present principles. Part or all of processing system 100 may be implemented in one or more of the elements of system 200, and/or one or more elements of computing environment 300.

Figure 4:
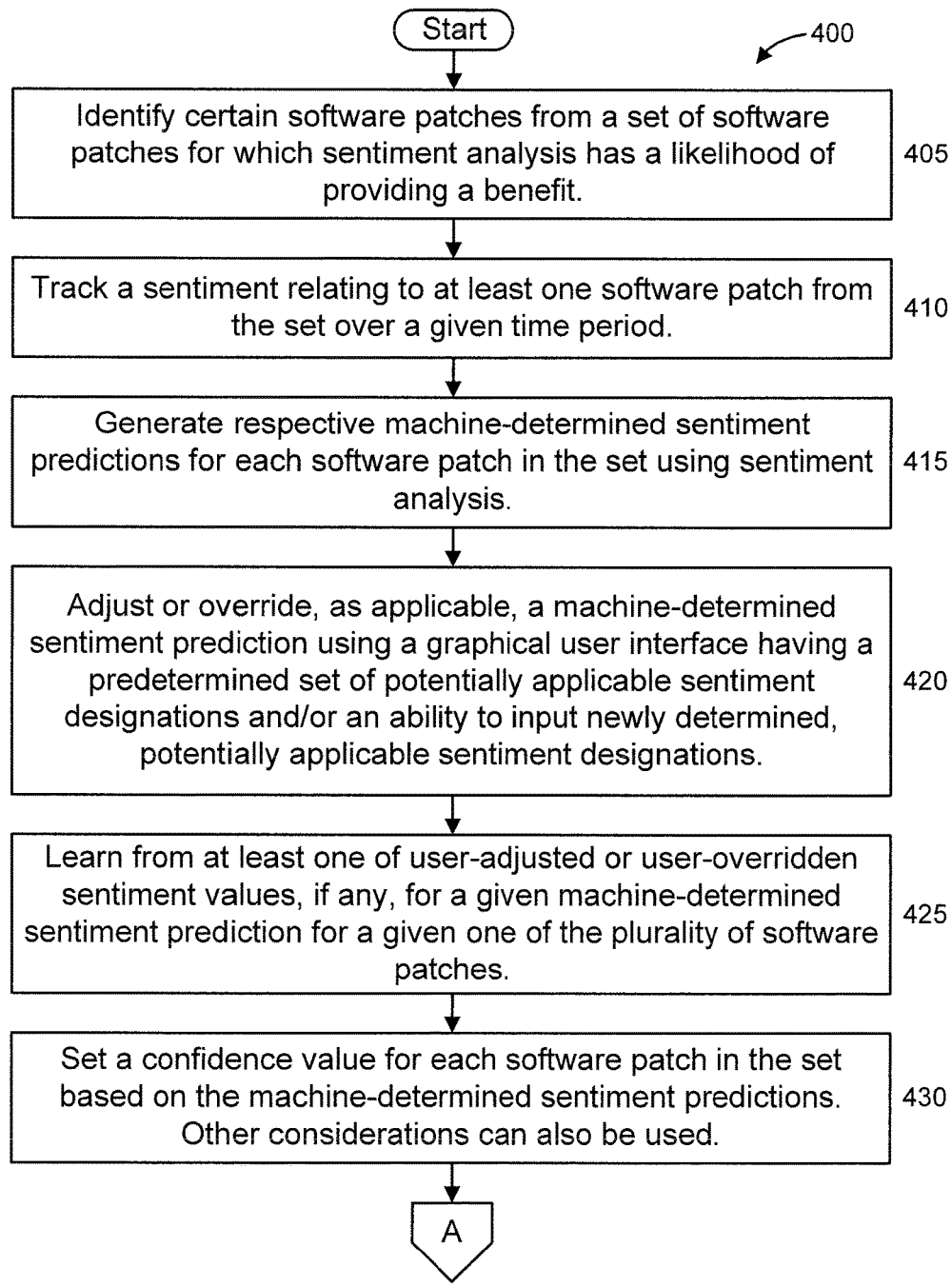
FIGS. 4-5 show an exemplary method 400 for learning intended user actions utilizing speech and gesture recognition, in accordance with an embodiment of the present principles.
Figure 5:
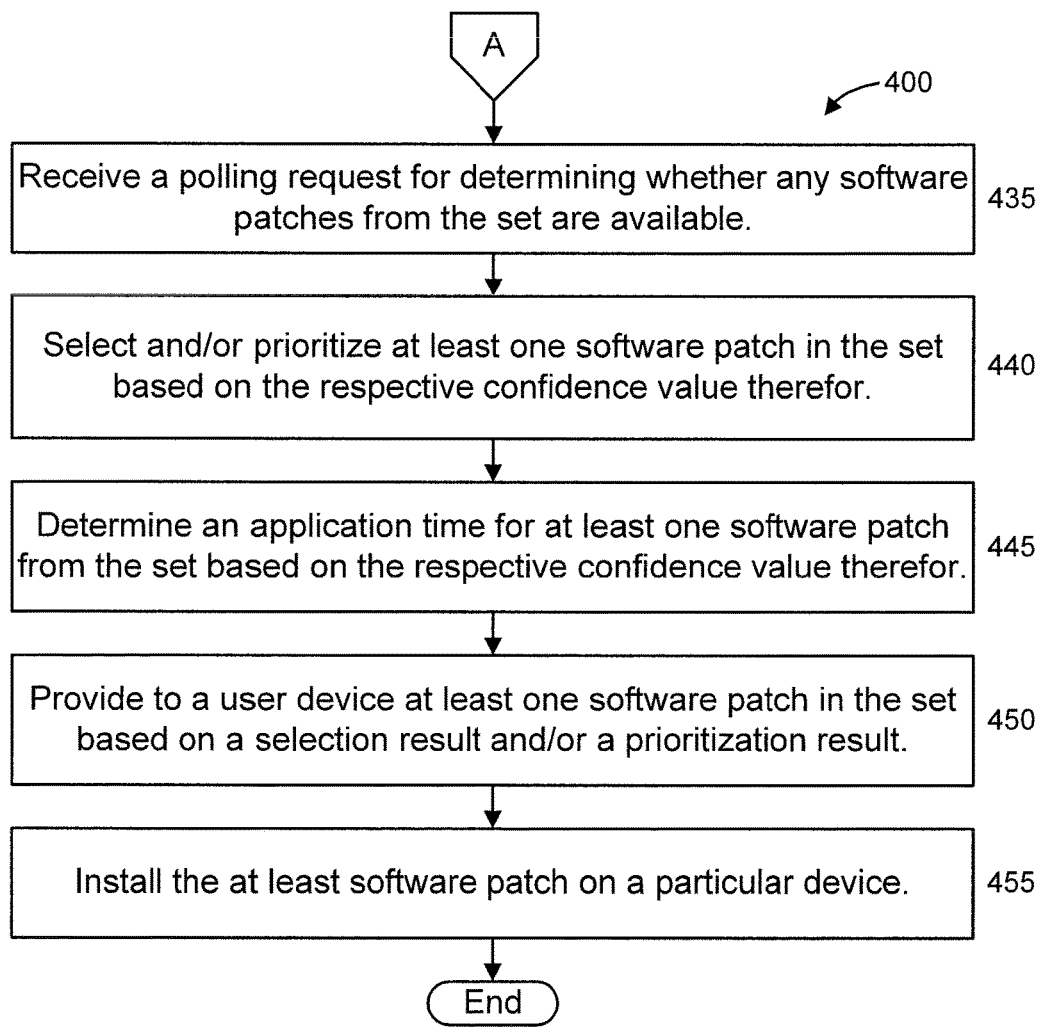
Figure 6:
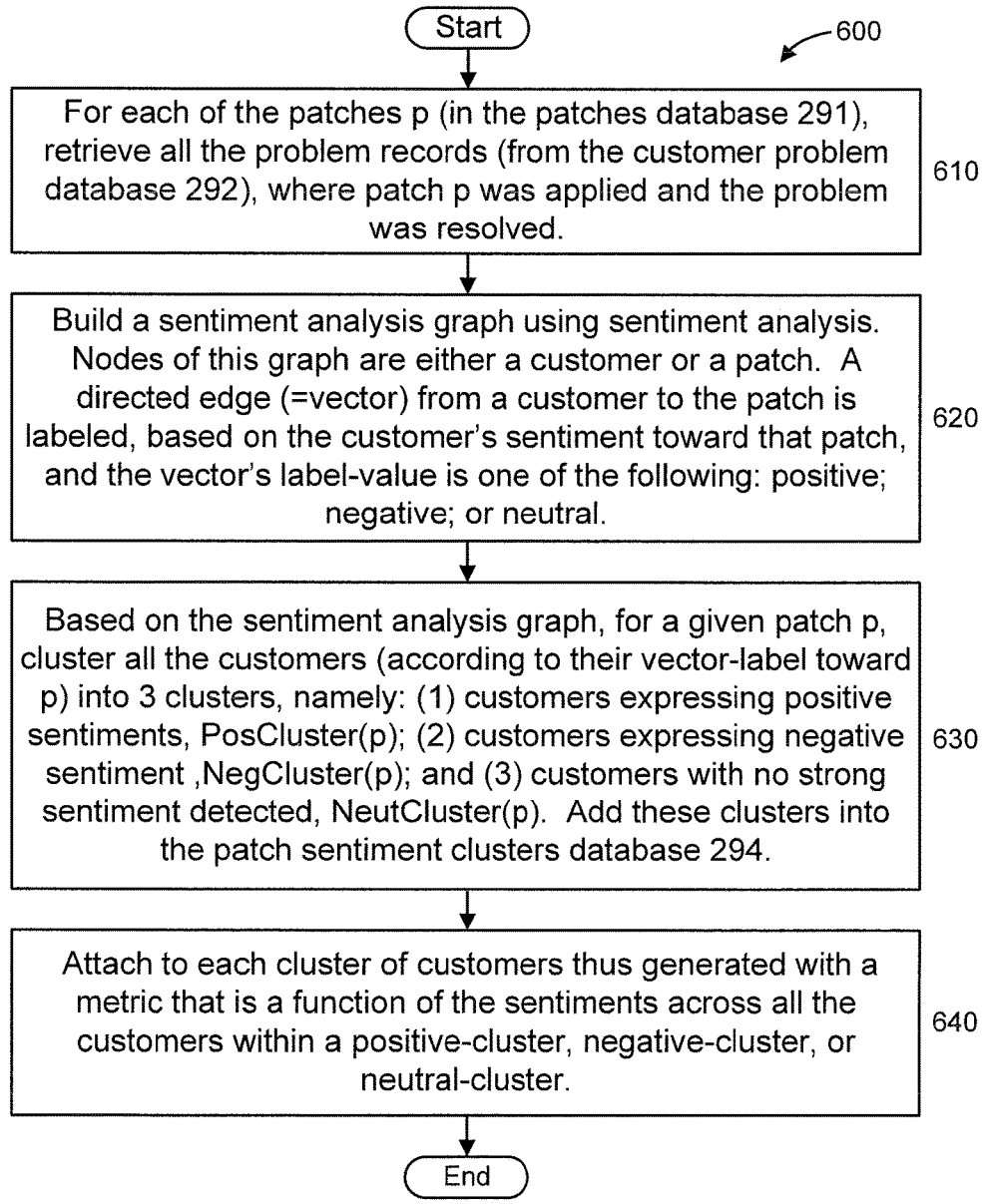
FIG. 6 shows an exemplary method 600 building client cohorts based on sentiment analysis for a given patch, in accordance with an embodiment of the present principles.
Figure 7:
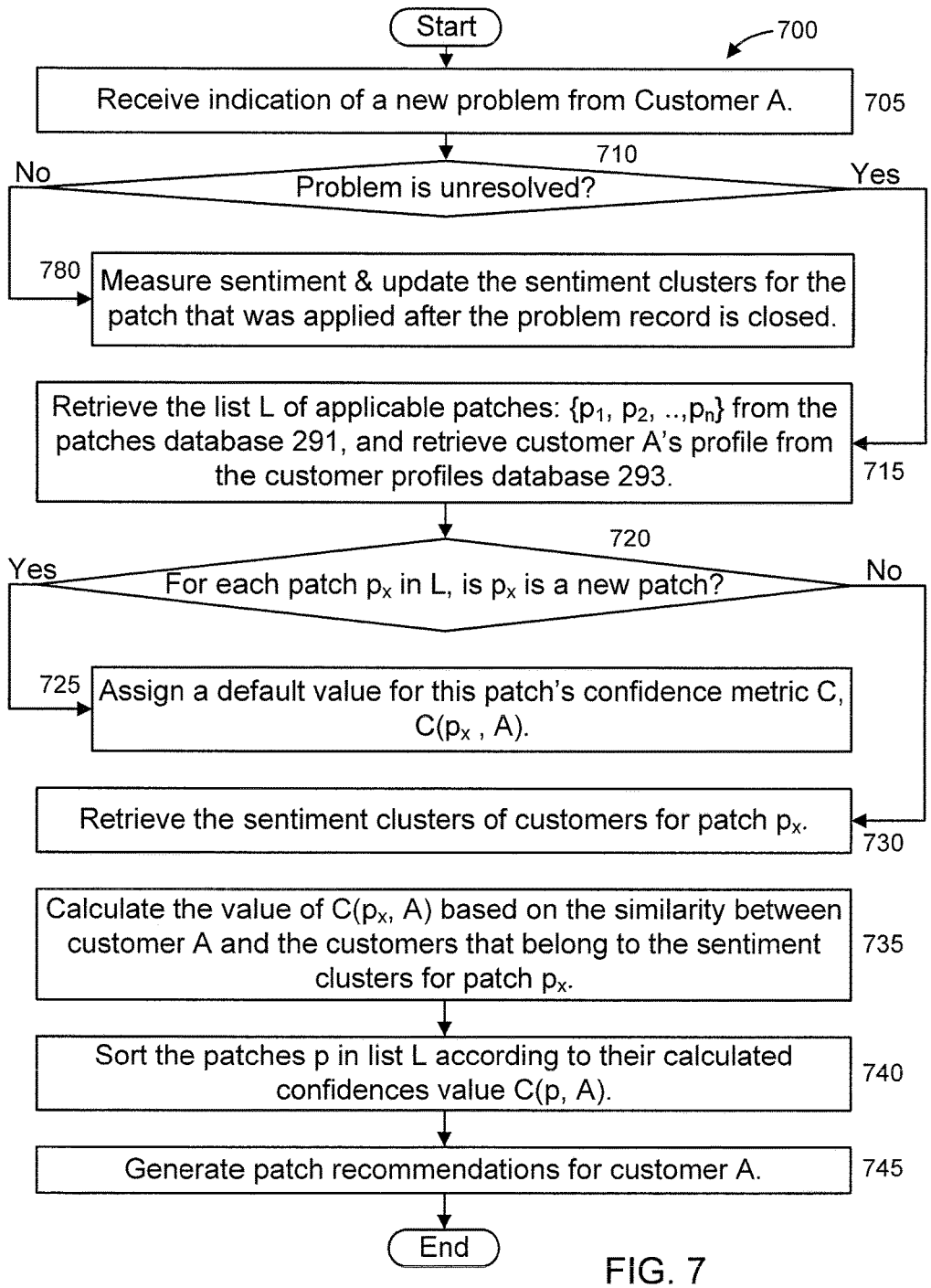
FIG. 7 shows an exemplary method 700 generating patch recommendations for Customer A, in accordance with an embodiment of the present principles.

Further, it is to be appreciated that processing system 100 may perform at least part of the method described herein including, for example, at least part of method 400 of FIGS. 4-5, and/or method 600 of FIG. 6, and/or method 700 of FIG. 7. Similarly, part or all of system 200 may be used to perform at least part of method 400 of FIGS. 4-5, and/or method 600 of FIG. 6, and/or method 700 of FIG. 7.

FIG. 2 shows an exemplary system 200 for managing software patches incorporating sentiment analysis, in accordance with an embodiment of the present principles.

The system 200 includes a sentiment analysis benefit likelihood determination device 210, a sentiment tracker 220, a machine-based sentiment prediction generator 230, a sentiment adjustment and overriding device (hereinafter "sentiment adjustment device) 240, a sentiment learning device 250, a sentiment-based confidence value generator 260, a software patch selector and prioritizer 270, a software patch providing device 280, a software patch application time determination device 285, and a memory device 290.

The sentiment analysis benefit likelihood determination device 210 identifies certain software patches from a set of software patches for which sentiment analysis has a likelihood of providing a benefit. In an embodiment, the sentiment analysis benefit likelihood determination device 210 can compare the likelihood to a threshold for a final determination of whether a benefit will be provided by sentiment analysis.

The sentiment tracker 220 can track a sentiment relating to at least one software patch from the set over a given time period. The given time period relates to a help-desk transcript, a document, any type of communication, and/or so forth. In an embodiment, the sentiment tracker 220 can perform sentiment tracking over the given time period for at least one of, a user, a group, an organization, an entity, a set of users, a set of groups, a set of organizations, and a set of entities. As used herein, in some embodiments, the term user can encompass any of the preceding.

The machine-based sentiment prediction generator 230 generates respective machine-determined sentiment predictions for each software patch in the set using sentiment analysis. The machine-based sentiment prediction generator 230 includes a sentiment analyzer 231 for performing sentiment analyses. In an embodiment, the machine-determined sentiment prediction generator 230 can involve perform natural language processing to determine one or more machine-determined sentiment predictions. In an embodiment, the machine-determined sentiment prediction generator 230 can generate the machine-determined sentiment predictions using culturally aware sentiment analysis that, in turn, uses automatically triggered questions formulated to elicit culturally distinguishable answers. In an embodiment, the machine-determined sentiment prediction generator 230 can involve minimize a time period for generating a particular machine-generated sentiment prediction by reusing a prior machine-generated sentiment prediction for at least one of a same user, a same group, and a same company, relating to at least one of a same software patch and a similar software patch.

In an embodiment, sentiment tracking per the sentiment tracker 220 and the generation of machine-determined sentiment predictions per the machine-determined sentiment prediction generator 230 can be constrained for only software patches identified by the sentiment analysis benefit likelihood determination device 210.

The sentiment adjustment device 240 receives adjustments or overrides, as applicable, to a machine-determined sentiment prediction via a graphical user interface (GUI) having a predetermined set of potentially applicable sentiment designations and/or an ability (such as command lines) to input newly determined, potentially applicable sentiment designations. The sentiment adjustment device 240 can include and/or otherwise interface with the GUI.

In an embodiment, the sentiment adjustment device 240 can include an alert device 241 that can automatically trigger an alert to an administrator based on certain criteria. Such criteria can include, for example, but is not limited to, the sentiment being out of alignment with previous sentiments determined for a corresponding software patch (for which the machine-generated sentiment prediction was generated) and/or for a similar software patch and/or for a particular user, group, organization, and/or so forth. Accordingly, upon receiving the alert and/or upon determining on his/her own that applicability of the particular machine-determined sentiment prediction should be reviewed, the administrator can review the particular machine-determined sentiment prediction and, if warranted upon such review, adjust or override the particular machine-determined sentiment prediction. In an embodiment, adjustments and overrides can be made by machine based on certain criteria. In an embodiment, both administrator made and machine made adjustments and overrides are permitted.

The sentiment learning device 250 learns from at least one of user-adjusted or user-overridden sentiment values, if any, for a given machine-determined sentiment prediction for a given one of the plurality of software patches. In an embodiment, learning can involve directing (e.g., swaying and/or otherwise modifying) a future machine-determined sentiment prediction based on learned information (i.e., adjustments and/or overrides). In this way, the accuracy and/or generation speed of subsequently generated machine-determined sentiment predictions can be increased.

The sentiment-based confidence value generator 260 sets a confidence value for each software patch in the set based on the machine-determined sentiment predictions.

The software patch selector and prioritizer 270 selects and/or prioritizes at least one software patch in the set based on the respective confidence value therefor. In an embodiment, the software patch selector and prioritizer 270 can generate a ranked list of at least one software patch in the set based on the respective confidence value therefor. In an embodiment, the software patch selector and prioritizer 270 can consider software patch dependencies along with sentiment dependencies for at least one of a user, a group, and an organization, in an environment where multiple software patches have a likelihood of being installed. In this way, selecting and/or prioritizing can be based on the dependencies. In an embodiment, the software patch selector and prioritizer 270 can consider other considerations related to the software patch and its use including, but not limited to, one of more of the following: a possible need for a "quick fix"; a test of the patch in a real-world setting; a level of risk that may be assumed; a level of security predicted to be needed; concerns about regulatory compliance or lack of such; concerns about the cost of patch choices; historical sentiments of a user, group, and/or organization, and team; and so forth.

The software patch providing device 280 provides to a user device at least one software patch in the set based on a selection result and/or a prioritization result.

The software patch application time determination device 285 determines an application time for at least one software patch from the set based on the respective confidence value therefor.

The memory device 290 stores information for software patch selection incorporating sentiment analysis. The memory device 290 can include a patches database 291, a customer problems database 292, a customer profiles database 293, and a patch sentiment clusters database 294. While shown as part of memory device 290, in an embodiment, one or more of databases 291-294 can be implemented in a distributed manner.

In the embodiment shown in FIG. 2, the elements thereof are interconnected by a bus 201/network(s). However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of system 200 may be incorporated in a distributed fashion in one or more separate devices including separate servers and the like. For example, different servers can be used to actually provide the software patches as compared to other devices such as other servers and the like that can determine which software patches to provide in the first place. Moreover, system 200 can be implemented using cloud technology and configurations as described herein. These and other variations of the elements of system 200 are readily determined by one of ordinary skill in the art, given the teachings of the present principles provided herein, while maintaining the spirit of the present principles.

FIG. 3 shows an exemplary computing environment 300 to which the present principles can be applied, in accordance with an embodiment of the present principles.

Computing environment 300 includes a set of user computing systems/devices 310 and a set of update and distribution servers 320.

The user computing systems/devices 310 can receive and use software patches in accordance with the teachings of the present principles. Accordingly, any of the user computing systems/devices 310 can issue, either automatically or in response to a manual input, a request to determine whether any particular software patches are applicable thereto. Such applicability can depend on the devices, software, and so forth included in each respective one of the user computing systems 310. User computing systems/devices 310 can be any of a desktop computer, a mobile computer, a cellular telephone, a tablet, and so forth. The preceding listing is merely illustrative and, thus, other types of computing system and devices can be used in accordance with the teachings of the present principles while maintaining the spirit of the present principles.

The update and distribution servers 320 can determine which software patches to provide and/or otherwise make available to the user computing systems 310 using sentiment analysis as described herein.

Communication between the user computing devices 310 and the update and distribution servers 320 can occur over one or more networks 301.

FIGS. 4-5 show an exemplary method 400 for managing software patches incorporating sentiment analysis, in accordance with an embodiment of the present principles.

At step 405, identify certain software patches from a set of software patches for which sentiment analysis has a likelihood of providing a benefit. Depending upon if step 405 is performed, then steps 410 and 415 can be constrained to track sentiment and generate machine-determined sentiment predictions for only software patches identified in step 405. In an embodiment, step 405 can involve comparing the likelihood to a threshold for a final determination of whether a benefit will be provided by sentiment analysis.

At step 410, track a sentiment relating to at least one software patch from the set over a given time period. The given time period relates to a help-desk transcript, a document, any type of communication, and/or so forth. In an embodiment, step 410 can involve performing sentiment tracking over the given time period for at least one of, a user, a group, a plurality of users, a plurality of groups, and a plurality of organizations.

At step 415, generate respective machine-determined sentiment predictions for each software patch in the set using sentiment analysis. In an embodiment, step 415 can involve performing natural language processing to determine one or more machine-determined sentiment predictions. In an embodiment, step 415 can involve generating the machine-determined sentiment predictions using culturally aware sentiment analysis that, in turn, uses automatically triggered questions formulated to elicit culturally distinguishable answers. In an embodiment, step 415 can involve minimizing a time period for generating a particular machine-generated sentiment prediction by reusing a prior machine-generated sentiment prediction for at least one of a same user, a same group, and a same company, relating to at least one of a same software patch and a similar software patch.

At step 420, adjust or override, as applicable, a machine-determined sentiment prediction using a graphical user interface having a predetermined set of potentially applicable sentiment designations and/or an ability (e.g., set of commands or programs) to input newly determined, potentially applicable sentiment designations. It is to be appreciated that step 420 is performed as needed, depending upon, for example, the applicability of the machine-determined sentiment prediction and/or conditions relating to the machine determined sentiment prediction. In an embodiment, step 420 can involve automatically triggering an alert to an administrator based on certain criteria. Such criteria can include, for example, but is not limited to, the sentiment being out of alignment with previous sentiments determined for a corresponding software patch (for which the machine-generated sentiment prediction was generated) and/or for a similar software patch and/or for a particular user, group, organization, and/or so forth. For example, anomaly detection techniques can be used to detect such outliers. Accordingly, upon receiving the alert and/or upon determining on his/her own that the applicability of the particular machine-determined sentiment prediction should be reviewed, the administrator can review the particular machine-determined sentiment prediction and, if warranted upon such review, adjust or override the particular machine-determined sentiment prediction. In an embodiment, adjustments and overrides can be made by machine based on the certain criteria. In an embodiment, both administrator made and machine made adjustments and overrides are permitted.

At step 425, learn from at least one of user-adjusted or user-overridden sentiment values, if any, for a given machine-determined sentiment prediction for a given one of the plurality of software patches. It is to be appreciated the performance of step 425 depends upon whether any machine-determined sentiment predictions have been adjusted or overridden in step 420. In an embodiment, learning can involve directing (e.g., swaying and/or otherwise modifying) a future machine-determined sentiment prediction based on learned information (i.e., adjustments and/or overrides). In this way, the accuracy and/or generation speed of subsequently generated machine-determined sentiment predictions can be increased.

At step 430, set a confidence value for each software patch in the set based on the machine-determined sentiment predictions. The confidence value is correlated with the sentiment predicted. For example, the more positive the sentiment, the higher the confidence value.

At step 435, receive a polling request for determining whether any software patches from the set are available. The determination can be made in response to an automatic setting on a user computing system (e.g., any of the computing systems/devices 300) to automatically update a given device and/or software or a manual request initiated by a user of the user computing system.

At step 440, select and/or prioritize at least one software patch in the set based on the respective confidence value therefor, responsive to the polling request. In an embodiment, step 440 can include generating a ranked list of at least one software patch in the set based on the respective confidence value therefor. In an embodiment, step 440 can involve considering software patch dependencies along with sentiment dependencies for at least one of a user, a group, and an organization, in an environment where multiple software patches have a likelihood of being installed. In this way, selecting and/or prioritizing can be based on the dependencies. In an embodiment, step 440 can involve considering other considerations related to the software patch and its use including, but not limited to, one of more of the following: a possible need for a "quick fix"; a test of the patch in a real-world setting; a level of risk that may be assumed; a level of security predicted to be needed; concerns about regulatory compliance or lack of such; concerns about the cost of patch choices; historical sentiments of a user, group, and/or organization, and team; and so forth.

At step 445, determine an application time for at least one software patch from the set based on the respective confidence value therefor.

At step 450, provide to a user device at least one software patch in the set based on a selection result and/or a prioritization result.

At step 455, install the at least one software patch on a particular device.

It is to be appreciated that while steps 405-450 can be performed by one or more systems including, for example, a distributed system(s), step 455 is performed by the computing system (e.g., any of the computing systems/devices 300) that is to ultimately incorporate the software patch therein.

FIG. 6 shows an exemplary method 600 building client cohorts based on sentiment analysis for a given patch, in accordance with an embodiment of the present principles.

At step 610, for each of the patches p (in the patches database 291), retrieve all the problem records (from the customer problem database 292), where patch p was applied and the problem was resolved.

At step 620, build a sentiment analysis graph using sentiment analysis. Nodes of this graph are either a customer or a patch. A directed edge (=vector) from a customer to the patch is labeled, based on the customer's sentiment toward that patch, and the vector's label-value is one of the following: positive; negative; or neutral.

At step 630, based on the sentiment analysis graph, for a given patch p, cluster all the customers (according to their vector-label toward p) into 3 clusters, namely: (1) customers expressing positive sentiments, PosCluster(p); (2) customers expressing negative sentiment, NegCluster(p); and (3) customers with no strong sentiment detected, NeutCluster(p). Add these clusters into the patch sentiment clusters database 294.

At step 640, attach to each cluster of customers thus generated with a metric that is a function of the sentiments across all the customers within a positive-cluster, negative-cluster, or neutral-cluster. The metric can be derived using techniques including, but not limited to, for example, Topic Modeling techniques or feature extraction techniques.

FIG. 7 shows an exemplary method 700 generating patch recommendations for Customer A, in accordance with an embodiment of the present principles.

At step 705, receive an indication of a new problem from Customer A. The indication can be a phone call, and so forth.

At step 710, determine whether or not the problem is unresolved. If so, the method 700 proceeds to step 715. Otherwise, the method 700 proceeds to step 780.

At step 715, retrieve a list L of applicable patches: $\{p_1, p_2, \ldots, p_n\}$ from the patches database 291, and retrieve customer A's profile from the customer profiles database 293.

At step 720, for each patch $p_x$ in list L, determine whether or not $p_x$ is a new patch. If so, then the method 700 proceeds to step 725. Otherwise, the method proceeds to step 730.

At step 725, assign a default value for this patch's confidence metric C, $C(p_x, A)$. For example, a default value of 0.5 (or any other value) can be chosen At step 730, retrieve the sentiment clusters of customers for patch $p_x$.

At step 735, calculate the value of $C(p_x, A)$ based on the similarity between customer A and the customers that belong to the sentiment clusters for patch $p_x$. The closer client A is to the positive cluster of customers, the higher the confidence metric. Conversely, the closer client A is to the negative cluster, the lower the confidence metric. Various techniques can be used to calculate the similarity including, but not limited to, for example, Vector Space Model, Edit distance, String kernels, and so forth, using the feature vector associated to each cluster and the customer profile A.

At step 740, sort the patches p in list L according to their calculated confidences value C(p, A).

At step 745, generate patch recommendations for customer A.

At step 780, measure sentiment & update the sentiment clusters for the patch that was applied after the problem record is closed.

Figure 8:
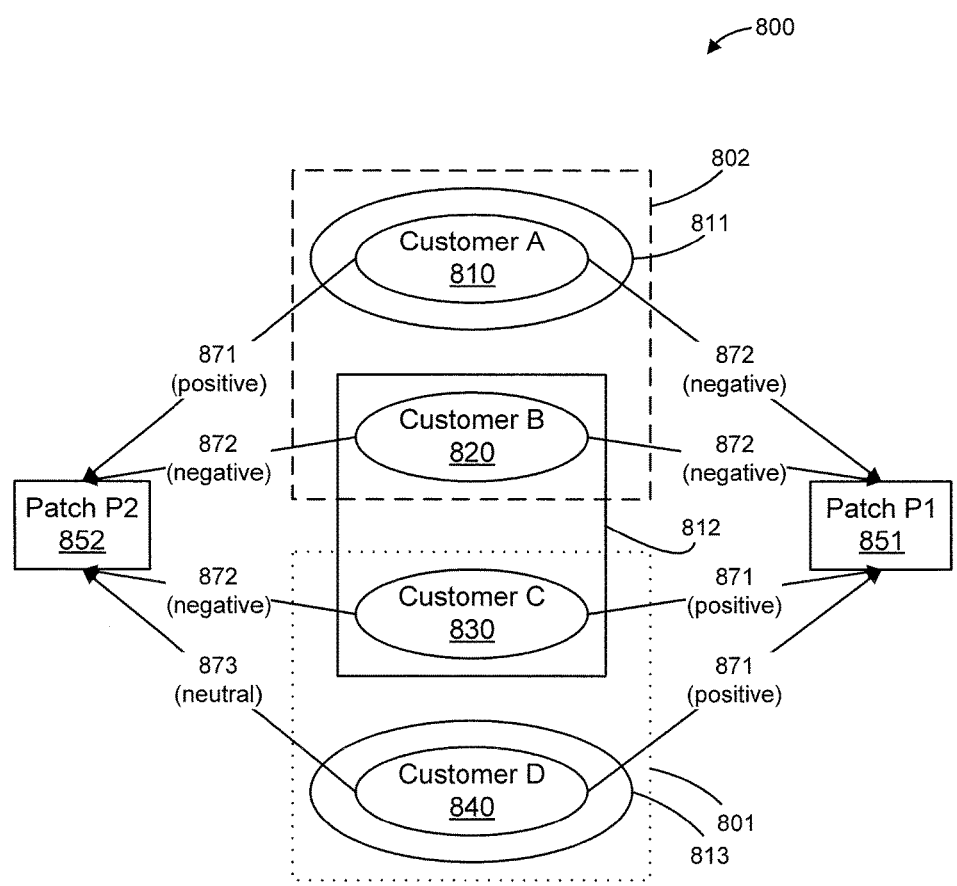
FIG. 8 shows an example of 5 patch sentiment clusters for 2 patches P1 and P2, in accordance with an embodiment of the present principles.

FIG. 8 shows an example of 5 patch sentiment clusters for 2 patches P1 and P2, in accordance with an embodiment of the present principles.

Customer C 830 and Customer D 840 form the positive cluster 801 for patch P1 851. Customer A 810 and Customer B 820 form the negative cluster 802 for patch P1 851. There is no neutral cluster for patch P1 851 in this example.

Customer A 810 forms the positive cluster 811 for patch P2 852. Customer B 820 and Customer C 830 form the negative cluster 812 for patch P2 852. Customer D 840 forms the neutral cluster 813 for patch P2 852.

Arrows 871 indicate positive sentiment. Arrows 872 indicate negative sentiment. Arrow 873 indicates neutral sentiment.

In an embodiment, a method, system, and/or service as disclosed herein can be utilized for software patch selection that incorporates sentiment analysis of documents, problem records, transcripts, and other kinds of communications among customers, support agent personnel, and other relevant parties as readily determined by one of ordinary skill in the art given the teachings of the present principles provided herein, while maintaining the spirit of the present principles. Based on this sentiment analysis, the system sets or adjusts a confidence level C associated with one or more potentially useful patches. Finally, this confidence level C is used to select one or more patches from a set of patches.

In an embodiment, this confidence level C may be used to determine the timing of one or more patches to be applied. As used herein, applied can involve making a patch available for downloading, the act of downloading and/or installation. This confidence level C can also be used in prioritizing or ranking a list of patches. Often a customer might need to apply a list of patches. Customers sometimes prefer to schedule the application of these patches at different times to minimize their system downtime. The sentiment-based confidence level can automatically be used to prioritize the list of patches or to select the most useful patches for a particular customer or situation.

As an example, consider a case in which a level of increasing dissatisfaction is determined from NLP (natural language processing) of help-desk call transcripts and, as a result, the confidence value C for choosing Patch 2 relative to Patch 1 changes. Thus, Patch 2 may be supplied rather than Patch 1. For example, IBM® maintains a database of problem records called a Problem Management Record (PMR) database. Each PMR record documents the interaction between the customer and the technical support personnel while resolving a problem. The PMR record also documents the patch or list of patches that have been applied and whether or not the customer was satisfied with them. Sentiment analysis can be used on such records as one way to evaluate the effectiveness of applied patches. An extremely angry or happy customer may, for example, suggest that patches with possible risks be used or not used, given any of: a possible need for a "quick fix"; a test of a patch in a real-world setting; a level of risk that might be assumed by a user, a group, or an organization, a level of security predicted to be needed, concerns about regulatory compliance or lack of such concerns, and so forth.

In an embodiment, a changing sentiment can be tracked through time (e.g., during a help-desk transcript), and the sentiment may be associated with one or more users, groups, organizations, and so forth. As used herein, the terms "group" and "team" are used interchangeably herein. Moreover, as used herein, a group can be formed from individuals having a common demographic (e.g., age, gender, employer (e.g., a company, country, etc.), and so forth. As an example grouping, changing sentiment can be tracked for several people with similar problems within a time period T. The several people can be considered a group in that they have a commonality, namely the similar problems within a time period T. Thus, the applicability of the present principles is broad, as readily appreciated by one of ordinary skill in the art, given the teachings of the present principles provided herein.

The sentiments as a function of time may include such sentiments as satisfaction, anger, confusion, threatening behavior, schizotypal behavior, sadness, fear, satisfaction, urgency, and so forth. It is to be appreciated that the preceding sentiments are merely illustrative and, thus, other sentiments can also be used in accordance with the teachings of the present principles, while maintaining the spirit of the present principles.

As alluded to in the above example, in an embodiment, the sentiment analysis may make use of NLP (natural language processing) (e.g., help-desk transcripts), and additional questions may be triggered and used to elicit answers that are predicted to facilitate sentiment analysis in a culturally aware fashion.

In an embodiment, the automatic sentiment determination may be overridden with a GUI (graphical user interface) that facilitates the selection of a sentiment (e.g., clicking on a cartoon face, and choosing among "positive", "negative", or "neutral", for example. Whenever the users manually add or adjust sentiment, their actions help the algorithms become smarter and more accurate).

Of course, the term "patch" is used in a general fashion and is applicable, but not limited, to any of the following: user software applications; operating systems; security features; ease-of-use features; data associated with applications; data associated with video game applications, etc.

In an embodiment, in order to minimize the time during which the computer system is waiting to perform a viable sentiment analysis, if needed, a sentiment analyzer can make use of prior sentiments of the same individual, team, company, demographic, and so forth. For example, prior sentiment analysis of the same customer can give an idea of the "toughness" of a customer relative to other customers with regard to similar problems. Such a metric can be taken into consideration when the sentiment analysis of the problem is measured. Prior sentiment analysis can also be used to check if the method of using sentiment analysis was useful or not in prior problems with the same customer.

In an embodiment, a patch selection tool may be used to identify software patches for which sentiment analysis is likely to be helpful (that is, provide one or more benefits). An initial list of recommended patches may be generated based on the installed products.

In an embodiment, the present principles may also consider software patch dependencies along with sentiment dependencies for any of a person, group, organization and so forth, in an environment where multiple software patches may be installed. If desired, the method for determining a sentiment associated with a customer query about a problem associated with a software entity may include inputting a plurality of texts associated with the entity, labeling seed words in the several texts as positive or negative, determining a score estimate for the several words based on the labeling, re-enumerating paths of the several words and determining a number of sentiment alternations, determining a final score for the several words using only paths whose number of alternations is within a threshold, converting the final scores to corresponding scores for each of the several words, and outputting the sentiment associated with the entity.

Also, a search system and method may be provided. Such a system may include constructing a graph-based query that is indicative of a user's preference-levels for different features of a problem (and one or more patches) associated with software. The constructed graph-based query is executed by comparing the user's preference-levels for the different features of the problem associated with software, which are graphically represented in the query, with information related to sentiments expressed by other users regarding the problem associated with software. Information related to the sentiments expressed by other users regarding the problem associated with software can include system-generated problem performance graphs constructed from comments regarding the problem obtained from the World Wide Web (or other network). Results returned and output upon execution of the graph-based query include system-generated problem graphs that are similar to the user-submitted query.

We now describe another example, in accordance with an embodiment of the present principles. A user or operator displays extreme anger about a particular problem encountered. This sentiment is automatically determined, with a particular level of confidence in the sentiment determination. Next, consider that two possible patches exist to solve the problem. Patch 1 is likely to give the irate user more satisfaction (and provide such satisfaction more quickly) than Patch 2; however, Patch 1 is more "expensive" than Patch 2 in that it requires the installation of an application that costs $X. Nonetheless, Patch 1 is now applied instead of Patch 2, to satisfy the customer. Note that an automated means can be used to determine if a customer is "gaming" the system by always pretending to be angry to obtain a more "expensive" Patch 1, because a call from a support team to the customer can be automatically triggered by a sentiment-triggering module (STM) or device so that a human might actually help determine a customer's level of anger, when needed.

Note that this example may combine both sentiment analysis and historical mining of customers using one patch versus another. In a related example, the patch-selection module or device may learn that some customers will consider expensive patches if they prefer ease of use relative to less-expensive patches and harder to apply patches. Thus, customer preferences and tendencies can be mined, along with related sentiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
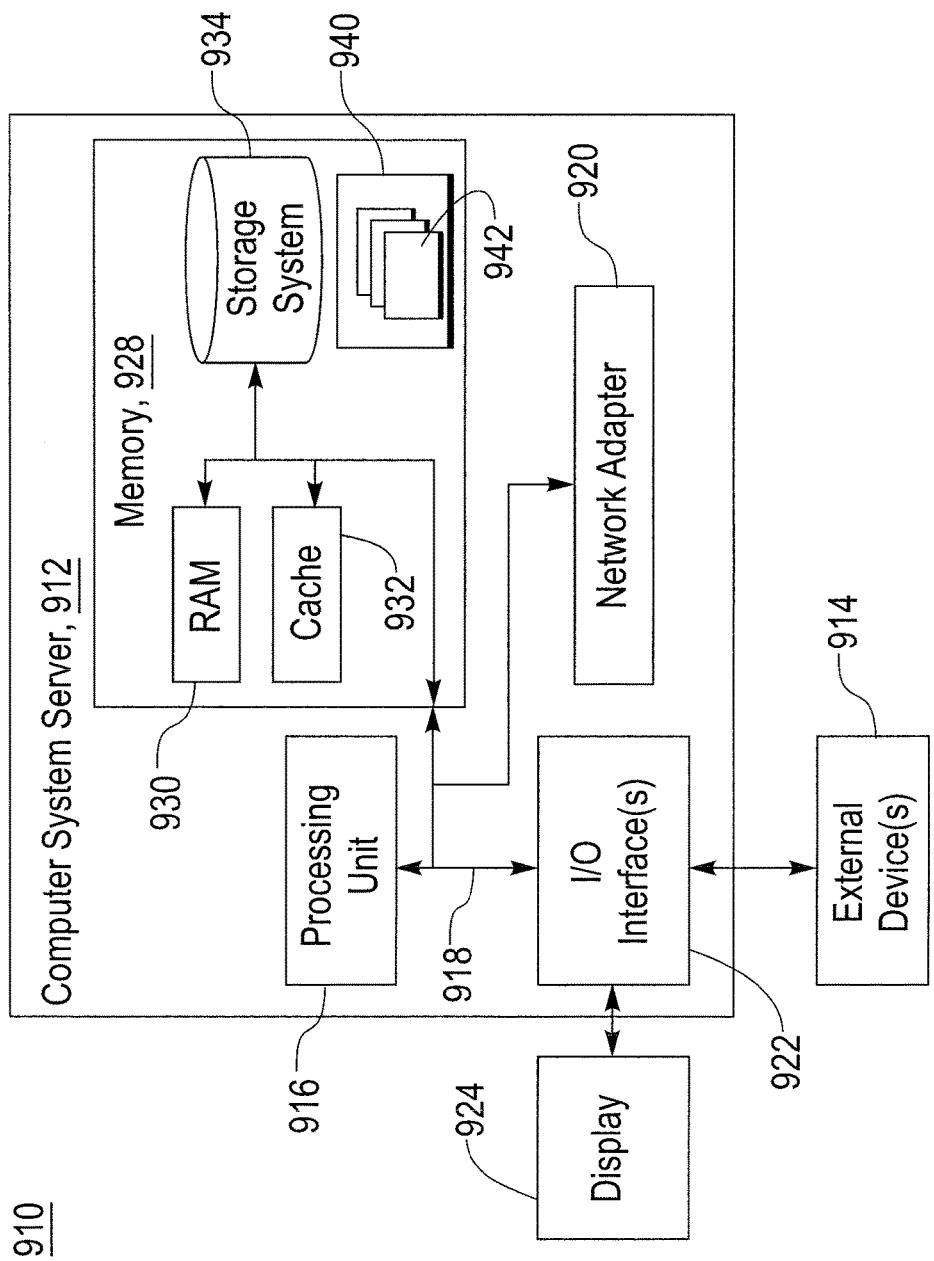
FIG. 9 shows an exemplary cloud computing node 910, in accordance with an embodiment of the present principles.

Referring now to FIG. 9, a schematic of an example of a cloud computing node 910 is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, data archival storage systems, etc.

Figure 10:
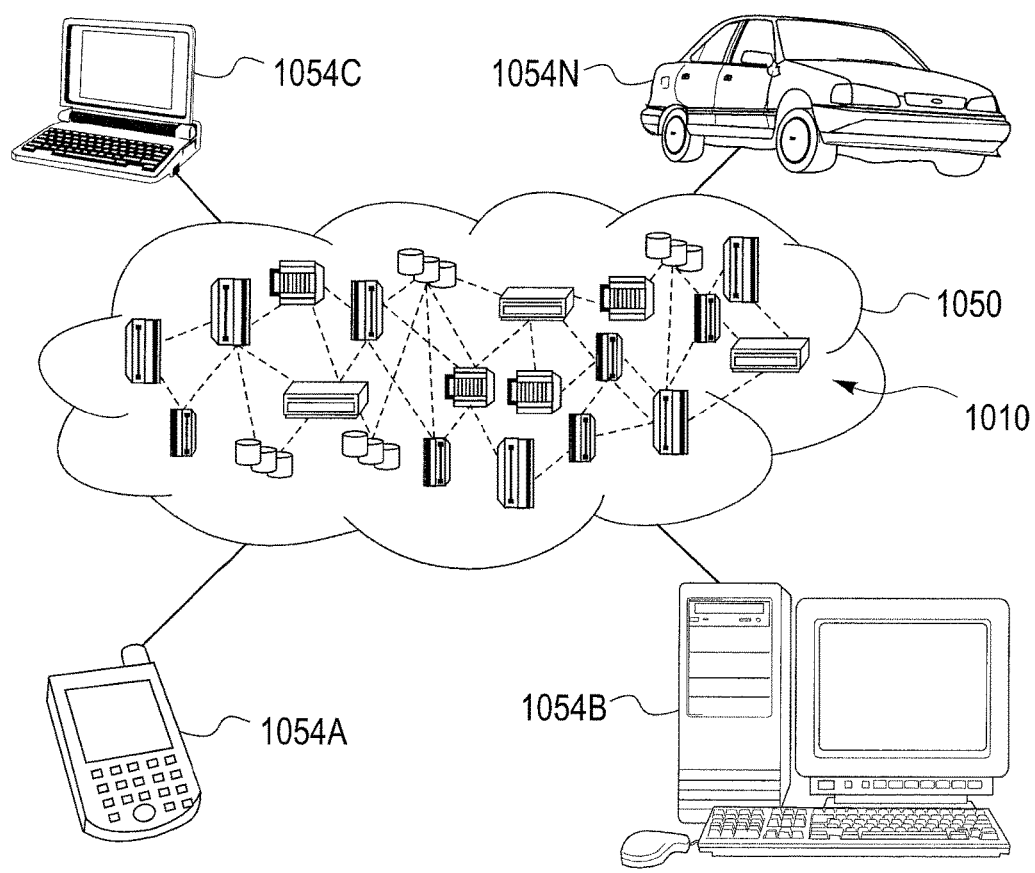
FIG. 10 shows an exemplary cloud computing environment 1050, in accordance with an embodiment of the present principles.

Referring now to FIG. 10, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
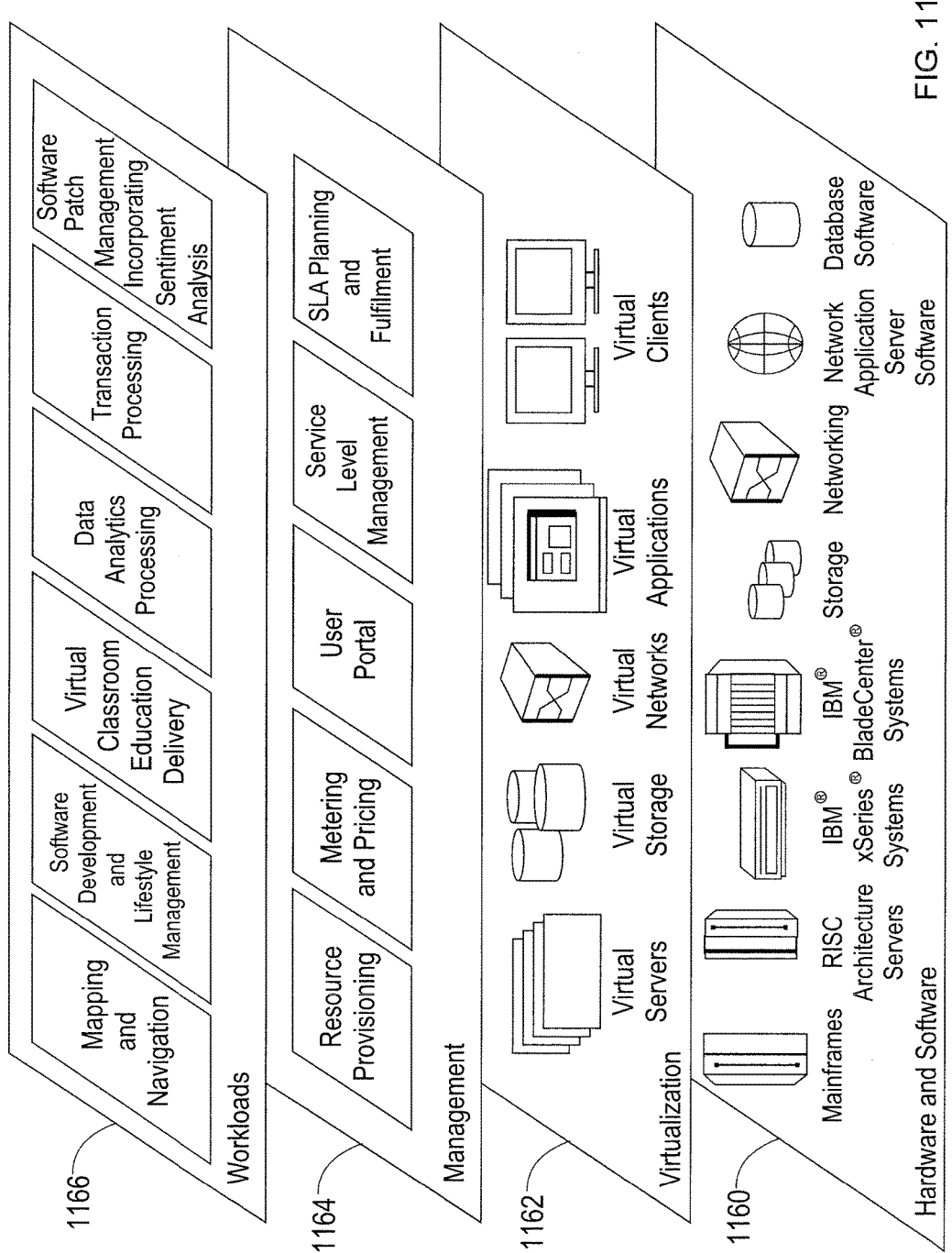
FIG. 11 shows exemplary abstraction model layers, in accordance with an embodiment of the present principles.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1162 provides an abstraction layer from which the following examples of virtual entities may be provided: virtual servers; virtual storage; virtual networks, including virtual private networks; virtual applications and operating systems; and virtual clients.

In one example, management layer 1164 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1166 provides examples of functionality for which the cloud computing environment may be utilized. Examples of workloads and functions which may be provided from this layer include: mapping and navigation; software development and lifecycle management; virtual classroom education delivery; data analytics processing; transaction processing; and software patch management incorporating sentiment analysis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for software patch management, the computer program product comprising a computer readable storage medium having program instructions embodied therewith, the program instructions executable by a computer to cause the computer to perform a method comprising:

generating, by a machine-based sentiment prediction generator, respective machine-determined sentiment predictions for each of a plurality of software patches using sentiment analysis;

setting, by a sentiment-based confidence value generator, a confidence value for each of the plurality of software patches based on the machine-determined sentiment predictions;

adjusting the machine-determined sentiment predictions based on learned information in response to an alert triggered based on predetermined criteria to generate one or more subsequent machine-determined sentiment predictions; and at least one of selecting and prioritizing, by a software patch selector and prioritizer, at least one of the plurality of software patches based on the respective confidence value therefor, wherein the sentiment analysis comprises:
building a sentiment analysis graph, where graph nodes represent at least one of respective users and respective software patches, and edges indicate sentiment between the respective users and the respective software patches; and
clustering the respective users into one of at least three clusters that include a positive sentiment cluster, a negative sentiment cluster, and a neutral sentiment cluster.

2. The computer program product of claim 1, wherein the method further comprises providing, by a software patch providing device, to a user device the least one of the plurality of software patches based on at least one of a selection result and a prioritization result.

3. The computer program product of claim 1, wherein said setting step comprises adjusting a confidence value for a given one of the plurality of software patches based on a sentiment analysis result for the given one of the plurality of software patches.

4. The computer program product of claim 1, wherein the method further comprises determining, by a software patch application time determination device, an application time for at least one of the plurality of software patches based on the respective confidence value therefor.

5. The computer program product of claim 1, wherein at least one of selecting and prioritizing at least one of the plurality of software patches comprises generating a ranked list of at least two of the plurality of software patches based on the respective confidence value therefor.

6. The computer program product of claim 1, wherein the sentiment analysis is of at least one of, at least one user, at least one group, and at least one organization.

7. The computer program product of claim 1, wherein the method further comprises tracking, by a sentiment tracker, a sentiment relating to at least one of the plurality of software patches over a given time period.

8. The computer program product of claim 7, wherein the given time period relates to a help-desk transcript.

9. The computer program product of claim 7, wherein the sentiment analysis comprises performing natural language processing to determine one or more of the machine-determined sentiment predictions.

10. The computer program product of claim 1, wherein the sentiment analysis further comprises attaching to each of the at least three clusters a respective metric or features vector that comprises common features among users within the same cluster.

11. The computer program product of claim 10, wherein the method further comprises adjusting or overriding a machine-determined sentiment prediction using a graphical user interface having a plurality of potentially applicable sentiment designations.

12. The computer program product of claim 11, wherein the plurality of potential overriding sentiment designations comprise positive, negative, and neutral.

13. The computer program product of claim 12, wherein the method further comprises learning, by a sentiment learning device, from at least one of user-overridden or user-adjusted sentiment values for a given machine-determined sentiment prediction for a given one of the plurality of software patches.

14. The computer program product of claim 1, wherein the machine-determined sentiment predictions are generated using culturally aware sentiment analysis that, in turn, uses automatically triggered questions formulated to elicit culturally distinguishable answers.

15. The computer program product of claim 1, wherein the method further comprises minimizing a time period for generating a particular machine-generated sentiment prediction by reusing a prior machine-generated sentiment prediction for a same user, a same group, and a same company, relating to at least one of a same software patch and a similar software patch.

16. The computer program product of claim 1, wherein the method further comprises identifying, by a sentiment analysis benefit likelihood determination device, certain ones of the plurality of software patches for which the sentiment analysis has a likelihood of providing a benefit.

17. The computer program product of claim 1, wherein the method further comprises considering, by the software patch selector and prioritizer, software patch dependencies along with sentiment dependencies for at least one of a user, a group, and an organization, in an environment where multiple software patches have a likelihood of being installed.

18. The computer program product of claim 1, wherein the sentiment prediction relates to feelings of a user regarding an installation of the plurality of software patches.

19. A system, comprising:
a processor, configured to:
generate respective machine-determined sentiment predictions for each of a plurality of software patches using sentiment analysis;
set a confidence value for each of the plurality of software patches based on the machine-determined sentiment predictions;
adjust the machine-determined sentiment predictions based on learned information in response to an alert triggered based on predetermined criteria to generate one or more subsequent machine-determined sentiment predictions; and
select and prioritize at least one of the plurality of software patches based on the respective confidence value therefor,
wherein the sentiment analysis comprises:
building a sentiment analysis graph, where graph nodes represent at least one of respective users and respective software patches, and edges indicate sentiment between the respective users and the respective software patches; and
clustering the respective users into one of at least three clusters that include a positive sentiment cluster, a negative sentiment cluster, and a neutral sentiment cluster.

* * * * *